(12) United States Patent
Borse et al.

(10) Patent No.: US 9,994,004 B2
(45) Date of Patent: Jun. 12, 2018

(54) MULTILAYER FILMS

(71) Applicant: NOVA Chemicals (International) S.A., Fribourg (CH)

(72) Inventors: Nitin Borse, Calgary (CA); Norman Dorien Joseph Aubee, Okotoks (CA); P. Scott Chisholm, Calgary (CA); Shivendra Kumar Goyal, Calgary (CA); Jamie Michael Marler, Calgary (CA)

(73) Assignee: NOVA CHEMICALS (INTERNATIONAL) S.A., Fribourg (CH)

( * ) Notice: Subject to any disclaimer, the term of this patent is extended or adjusted under 35 U.S.C. 154(b) by 402 days.

(21) Appl. No.: 14/187,671

(22) Filed: Feb. 24, 2014

(65) Prior Publication Data
US 2014/0272366 A1 Sep. 18, 2014

(30) Foreign Application Priority Data
Mar. 12, 2013 (CA) ..................................... 2809402

(51) Int. Cl.
B32B 27/32 (2006.01)
B32B 27/00 (2006.01)
B29C 47/56 (2006.01)
B29C 47/00 (2006.01)
B29C 47/06 (2006.01)
B29C 47/92 (2006.01)
B32B 27/08 (2006.01)

(52) U.S. Cl.
CPC .......... B32B 27/32 (2013.01); B29C 47/0026 (2013.01); B29C 47/065 (2013.01); B29C 47/56 (2013.01); B29C 47/92 (2013.01); B32B 27/00 (2013.01); B29C 2947/92647 (2013.01); B29C 2947/92942 (2013.01); B32B 27/08 (2013.01); B32B 27/327 (2013.01); B32B 2250/242 (2013.01); B32B 2270/00 (2013.01); B32B 2307/31 (2013.01); B32B 2307/514 (2013.01); B32B 2307/558 (2013.01); B32B 2307/58 (2013.01); B32B 2307/5825 (2013.01); B32B 2307/72 (2013.01); B32B 2307/7265 (2013.01); B32B 2307/732 (2013.01); B32B 2439/00 (2013.01); B32B 2439/70 (2013.01); Y10T 428/31913 (2015.04)

(58) Field of Classification Search
CPC ................. B32B 2439/00; B32B 27/32; Y10T 428/31913
See application file for complete search history.

(56) References Cited

U.S. PATENT DOCUMENTS

| 5,089,321 | A | 2/1992 | Chum et al. | |
|---|---|---|---|---|
| 2001/0016632 | A1* | 8/2001 | Sipos | C08F 210/16 526/65 |
| 2009/0246491 | A1* | 10/2009 | Cortes | B32B 27/32 428/213 |

OTHER PUBLICATIONS

ASTM D 1709-04; Standard Test Method for Impact Resistance of Plastic Film by the Free-Falling Dart Method; ASTM International; pp. 1-9.
ASTM D 1922-03a; Standard Test Method for Propagation Tear Resistance of Plastic Film and Thin Sheeting by Pendulum Method; ASTM International; pp. 1-6.
ASTM D 882-10; Standard Test Method for Tensile Properties of Thin Plastic Sheeting; ASTM International; pp. 1-10.
ASTM D 792-08; Standard Test Methods for Density and Specific Gravity (RElative density) of Plastics by Displacement; ASTM International; pp. 1-6.
ASTM D 1238-10; Standard Test Method for Melt Flow Rates of Thermoplastics by Extrusion Plastometer; ASTM International; pp. 1-15.
ASTM F 1921/F 1921M-12; Standard Test Methods for Hot Seal Strength (Hot Tack) of Thermoplastic Polymers and Blends Comprising the Sealing Surfaces of Flexible Webs; ASTM International; pp. 1-9.

* cited by examiner

Primary Examiner — Lawrence Ferguson
(74) Attorney, Agent, or Firm — Julie L. Heinrich

(57) ABSTRACT

A multilayer film is prepared from a high impact strength polyethylene (HI polyethylene); a Ziegler Natta catalyzed polyethylene (Z/N polyethylene) and a high pressure low density polyethylene (LD polyethylene) with i) at least one skin layer consists essentially of HI polyethylene and ii) at least one core layer comprises a blend of Z/N polyethylene and said LD polyethylene. The HI polyethylene has a density of from 0.915 to about 0.930 g/cc and a normalized impact strength of at least about 300 g/mil. The amount of HI polyethylene is from about 30 to about 55 weight % (based on the combined weights of the HI+Z/N+LD polyethylenes). The films described herein are readily prepared on blown film equipment and provide an excellent balance of mechanical properties.

18 Claims, No Drawings

MULTILAYER FILMS

FIELD OF THE INVENTION

Described herein are multilayer plastic films.

BACKGROUND

Polyethylene film is widely used in many packaging applications.

The type of polyethylene that was first commercially available is prepared under high pressure using a free radical initiator. This type of polyethylene is widely known as high pressure/low density polyethylene and as "LD" polyethylene. LD polyethylene is easy to process but monolayer films prepared with LD polyethylene have comparatively poor mechanical properties.

The use of Ziegler Natta ("Z/N") catalysts enables the production of ethylene copolymers having better mechanical properties than LD polyethylene—but these copolymers are more difficult to process than LD polymers.

More recently, the use of metallocene catalysts has allowed the production of ethylene copolymers having enhanced impact strength (but, again, with the expense of poor processability in comparison to LD polyethylene).

The use of blends of polyethylenes to prepare monolayer films is well known. For example, it is known to blend LD polyethylene with Z/N catalyzed polyethylene or metallocene catalyzed polyethylene to improve processability—but the mechanical properties of the blends are compromised. It is also known to improve multilayer films using these polyethylenes. In practical terms, the loss of impact strength is especially problematic when blending LD polyethylene with a metallocene catalyzed polyethylene having a density of from about 0.915 to 0.930 g/cc. This is because lower density metallocene polyethylenes have such high impact strengths that losses are more easily tolerated. Because higher density metallocene resins have lower impact strength to begin with they are generally not used in film applications where impact strength is important.

SUMMARY

In one embodiment, the present invention provides:

a multilayer film comprising high impact ("HI") polyethylene having a density of from 0.915 to about 0.930 g/cc and an SCBDI of from about 70 to about 100; Z/N polyethylene and an LD polyethylene, said film comprising;

A) a skin layer consisting essentially of said HI polyethylene; and

B) a core layer comprising a blend of said Z/N polyethylene and said LD polyethylene, with the provisos that
  a) the amount of said HI polyethylene is from about 30 to about 55 weight %, based on the combined weight of said HI polyethylene plus said Z/N polyethylene plus said LD polyethylene; and
  b) the amount of said LD polyethylene is from about 5 to about 20 weight %, based on the combined weight of said HI polyethylene plus said Z/N polyethylene plus said LD polyethylene.

Another embodiment provides a multilayer film from about 1 to about 6 mils in total thickness, comprising HI polyethylene; and a Z/N polyethylene and an LD polyethylene; said film comprising a skin layer comprising said HI polyethylene; and a core layer comprising a blend of said Z/N polyethylene and said LD polyethylene, wherein i) said HI polyethylene has a density in the range of from 0.915 to about 0.930 g/cc, a melt index, $I_2$, of from about 0.5 to about 2.0 g/10 minutes, an SCBDI of from about 70 to about 100 and is present in the range from about 30 to about 55 weight %, based on the combined weight of said HI polyethylene plus said Z/N polyethylene plus said LD polyethylene; and ii) said LD polyethylene has a melt index, $I_2$, of from about 0.3 to about 5 g/10 minutes and a density of from about 0.915 to about 0.930 g/cc and is present in the range from about 5 to about 20 weight %, based on the combined weight of said HI polyethylene plus said Z/N polyethylene plus said LD polyethylene; and iii) said Z/N polyethylene has a density of from about 0.915 to about 0.960 g/cc and a melt index, $I_2$, of from about 0.5 to about 5 g/10 minutes.

Another embodiment provides a polyethylene package comprising a multilayer film comprising HI polyethylene; and a Z/N polyethylene and an LD polyethylene; said film comprising A) a skin layer comprising said HI polyethylene; and B) a core layer comprising a blend of said Z/N polyethylene and said LD polyethylene, wherein, i) said HI polyethylene has a density in the range of from 0.915 to about 0.930 g/cc, a melt index, $I_2$, of from about 0.5 to about 2.0 g/10 minutes, an SCBDI of from about 70 to about 100 and is present in the range from about 30 to about 55 weight %, based on the combined weight of said HI polyethylene plus said Z/N polyethylene plus said LD polyethylene; and ii) said LD polyethylene has a melt index, $I_2$, of from about 0.3 to about 5 g/10 minutes and a density of from about 0.915 to about 0.930 g/cc and is present in the range from about 5 to about 20 weight %, based on the combined weight of said HI polyethylene plus said Z/N polyethylene plus said LD polyethylene; and iii) said Z/N polyethylene has a density of from about 0.915 to about 0.960 g/cc and a melt index, I2, of from about 0.5 to about 5 g/10 minutes.

DETAILED DESCRIPTION

Other than in the operating examples or where otherwise indicated, all numbers or expressions referring to quantities of ingredients, reaction conditions, etc., used in the specification and claims are to be understood as modified in all instances by the term "about". Accordingly, unless indicated to the contrary, the numerical parameters set forth in the following specification and attached claims are approximations that can vary depending upon the desired properties, which the present invention desires to obtain. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical values, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between and including the recited minimum value of 1 and the recited maximum value of 10; that is, having a minimum value equal to or greater than 1 and a maximum value of equal to or less than 10. Because the disclosed numerical ranges are continuous, they include every value between the minimum and maximum values.

Unless expressly indicated otherwise, the various numerical ranges specified in this application are approximations.

All compositional ranges expressed herein are limited in total to and do not exceed 100 percent (volume percent or weight percent) in practice. Where multiple components can be present in a composition, the sum of the maximum amounts of each component can exceed 100 percent, with the understanding that, and as those skilled in the art readily understand, that the amounts of the components actually used will conform to the maximum of 100 percent.

A. Z/N Polyethylene

The term "Ziegler Natta catalyst" is well known to those skilled in the art and is used herein to convey its conventional meaning. Ziegler Natta catalysts comprise at least one transition metal compound of a transition metal selected from groups 3, 4, or 5 of the Periodic Table (using IUPAC nomenclature) and an organoaluminum component which is defined by the formula:

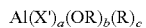

$$Al(X')_a(OR)_b(R)_c$$

wherein: X' is a halide (for example, chlorine); OR is an alkoxy or aryloxy group; R is a hydrocarbyl (for example, an alkyl having from 1 to 10 carbon atoms); and a, b, and c are each 0, 1, 2, or 3 with the provisos text a+b+c=3 and b+c≥1.

In some embodiments, the transition metal compounds are titanium or vanadium. Exemplary titanium compounds include titanium halides (for example, titanium chlorides, such as, $TiCl_4$); titanium alkyls; titanium alkoxides (which may be prepared by reacting a titanium alkyl with an alcohol) and "mixed ligand" compounds (i.e., compounds which contain more than one of the above described halide, alkyl and alkoxide ligands). Exemplary vanadium compounds may also contain halide, alkyl or alkoxide ligands. In addition, vanadium oxy trichloride ("$VOCl_3$") is known as a Ziegler Natta catalyst component and is suitable for use in some embodiments.

The above defined organoaluminum compound is a component of the Ziegler Natta catalyst. The mole ratio of aluminum to transition metal (for example, aluminum/(titanium+vanadium)) is, for example, from about 1/1 to about 100/1, or from about 1.2/1 to about 15/1.

As will be appreciated by those skilled in the art of ethylene polymerization, conventional Ziegler Natta catalysts may also incorporate additional components such as, an electron donor (for example, an amine; or a magnesium compound), or a magnesium alkyl (such as, butyl ethyl magnesium) and a halide source (such as, tertiary butyl chloride).

Such components, if employed, may be added to the other catalyst components prior to introduction to the reactor or may be directly added to the reactor.

The Z/N polyethylene used in some embodiments is prepared using the above described catalyst system. The use of both ethylene homopolymers and copolymers of ethylene with a $C_{4\ to\ 8}$ alpha olefin is contemplated. The Z/N polyethylene used in some embodiments has a melt index ($I_2$) of from about 0.2 to about 10 grams per 10 minutes (or, for example, from about 0.5 to about 5 grams per 10 minutes) and a density of from about 0.910 to about 0.965 g/cc (or, for example, from about 0.915 to about 0.960 g/cc).

B. High Impact Strength Polyethylene (HI Polyethylene)

It will be appreciated by those skilled in the art that Z/N catalysts produce ethylene copolymers having a comparatively broad molecular weight distribution and a comparatively broad distribution of short chain branches in relation to ethylene copolymers prepared with a metallocene catalyst. The differences in polymer structure affect the properties of the different polyethylenes. For example, ethylene copolymers prepared with a metallocene catalyst typically have a higher impact strength in comparison to ethylene copolymers having the same density and melt index but prepared with a Z/N catalyst.

The HI polyethylene may be prepared with a metallocene catalyst. As used herein, the term metallocene catalyst means that the catalyst contains at least one cyclopentadienyl liquid. Such catalysts (and HI polyethylene prepared from them) are well known and in widespread commercial use.

The branching distribution in ethylene copolymers may be defined using the so called short chain branching distribution index (SCBDI). Polyethylene copolymers that are prepared with a metallocene catalyst generally have a narrow branching distribution (which corresponds to a high SCBDI value). SCBDI is defined as the weight % of the polymer that has a comonomer content with 50% of the median comonomer content of the polymer. SCBDI is determined according to the method described in U.S. Pat. No. 5,089,321 (Chum et al.). The HI polymers have an SCBDI of from about 70 to about 100, which corresponds to a narrow branching distribution.

Very low density polyethylene (having a density of less than 0.915 g/cc) that is prepared with a metallocene catalyst typically has exceptionally high impact strength. These polymers may be blended with LD polyethylene to improve processability and the blend will still exhibit high impact strength in absolute terms. For clarity: the blend does cause a reduction in impact strength but the real impact strength is normally still quite high (given the extremely high initial impact strength of the very low density polyethylene).

The present invention does not include the use of very low density copolymers (having a density of less than 0.915 g/cc). Instead, the multilayer films described herein utilize metallocene copolymers having a density in the range of from 0.915 to about 0.930 g/cc. In one embodiment, the melt index of the HI polymers is from about 0.5 to about 2.0 g/10 minutes. Blown films prepared from such copolymers may have a high initial impact strength—with a value of at least about 300 grams for a one mil film. However, these copolymers can also be comparatively difficult to extrude.

The extrusion difficulties are generally manifested in two ways: lower extruder output (and/or more power required for a given output) and compromised stability of the blown film bubble. While these extrusion problems can be mitigated by blending the HI resin with LD resin, this may cause a reduction in the impact strength of the final film. This problem is often seen with the HI polyethylenes (i.e., polyethylenes having a density of from 0.915 to 0.930 g/cc) because the initial impact strength of these resins is not as high as the initial impact strength of lower density polyethylenes.

The multilayer films described herein resolve these problems in the following manner, in part:

1) the HI resin is not blended with LD resin—instead, the LD resin is blended with the Z/N resin; and 2) bubble stability is provided by extruding a layer that is a blend of Z/N resin with LD resin; with the further provisos that a. the total amount of HI resin is less than or equal to about 55 weight % (of the combined weights of HI+Z/N+LD polyethylene), and b. the total amount of LD resin is from about 5 to about 20 weight % (of the combined weights of HI+Z/N+LD polyethylenes).

We have observed that the blends and multilayer layer structure of the films described herein allow good bubble stability for the blown film process and provide a multilayer film having a good balance of mechanical properties.

In summary, useful HI polyethylenes have
1) a density of from 0.915 to about 0.930 g/cc; and
2) an SCBDI of from about 70 to about 100; and
3) a melt index of from about 0.5 to about 2.0 g/10 minutes.

A monolayer blown film that is prepared from these HI polyethylenes will typically exhibit a normalized impact strength of at least about 300 grams. The term "normalized" is meant to convey its conventional meaning to a person skilled in the art. It reflects a correction for the thickness of the film—for example, a monolayer film having a 1.5 mil thickness would have a total (actual) impact strength 450 grams in order to have a normalized thickness of 300 grams/mil (i.e., 450/1.5=300).

C. High Pressure Low Density (LD) Polyethylene

LD polyethylene is well-known and may be purchased commercially or prepared by the polymerization of ethylene under high pressure using a free radical initiator (such as, a hydroperoxide). The LD polymer may be prepared in a tubular or autoclave reactor and has a melt index ($I_2$) of from about 0.2 to about 10 grams per 10 minutes (or, for example, from about 0.3 to about 5 g/10 minutes or from about 0.3 to about 3) and a density of from about 0.915 to about 0.930 g/cc.

D. Film Structure

While the number of layers in the multilayer films described herein is not limiting, in some embodiments, the multilayer films contain 3 or 5 layers. In some embodiments, the multilayer films have more than 5 layers, or more than 7 layers.

A three layer film structure may be described as layers A-B-C, where the internal layer B (the "core" layer) is sandwiched between two external or "skin" layers A and C.

In some embodiments, of multilayer films, including the three layer film, one or both of the skin layers is made from a resin that provides good seal strength and is often as a sealant layer.

In some embodiments, the total thickness of the films is from about 1 to about 6 mils, or from about 1 to about 4 mils, or from about 1 to about 3 mils, or from about 3 to about 6 mils, or from about 2 to about 4 mils, or from about 2 to about 6 mils.

In one embodiment, for films that are less than about 2 mils total thickness, the core layer contains from about 40 to about 70 weight % of the total amount of polyethylene and is at least about 0.5 mils thick, or at least about 0.75 mils, or at least about 1.0 mils.

E. Additives

The polyethylene may contain conventional additives, especially (1) primary antioxidants (such as, hindered phenols, including vitamin E); (2) secondary antioxidants (especially, phosphites and phosphonites); and (3) process aids (especially, fluoroelastomer and/or polyethylene glycol process aid).

F. Film Extrusion Process

Blown Film Process

The extrusion-blown film process is a well-known process for the preparation of multilayer plastic film. Multilayer films are prepared using multiple extruders which heat, melt and convey the molten plastics and forces them through multiple annular dies. Typical extrusion temperatures are from about 330° F. to about 500° F., or from about 350° F. to about 460° F. Thus, 3 layer films are prepared using three extruders and three dies which together form a bubble having three layers.

The polyethylene film is drawn from the die and formed into a tube shape and eventually passed through a pair of draw or nip rollers. Internal compressed air is then introduced from the mandrel causing the tube to increase in diameter forming a bubble of the desired size. Thus, the blown film is stretched in two directions, namely in the axial direction (by the use of forced air which blows out the diameter of the bubble) and in the lengthwise direction of the bubble (by the action of a winding element which pulls the bubble through the machinery). External air is also introduced around the bubble circumference to cool the melt as it exits the die. Film width is varied by introducing more or less internal air into the bubble, thus increasing or decreasing the bubble size. Film thickness is controlled primarily by increasing or decreasing the speed of the draw roll or nip roll to control the draw-down rate.

The bubble is then collapsed into two doubled layers of film immediately after passing through the draw or nip rolls. The cooled film can then be processed further by cutting or sealing to produce a variety of consumer products. While not wishing to be bound by theory, it is generally believed by those skilled in the art of manufacturing blown films that the physical properties of the finished films are influenced by both the molecular structure of the polyethylene and by the processing conditions. For example, the processing conditions are thought to influence the degree of molecular orientation (in both the machine direction and the axial or cross direction).

A balance of the machine direction ("MD") and transverse direction ("TD"-which is perpendicular to MD) molecular orientations is generally thought to optimize the desirable properties associated with the multilayer films described herein (for example, Dart Impact strength, Machine Direction and Transverse Direction tear properties).

Again, while not wishing to be bound by theory, it is generally believed by those skilled in the art of manufacturing blown films that these stretching forces on the bubble may affect the physical properties of the finished film. For example, the "blow up ratio" (i.e., the ratio of the diameter of the blown bubble to the diameter of the annular die) may have a significant effect upon the dart impact strength and tear strength of the finished film.

Further details are provided in the following examples. The following examples are merely illustrative of the invention and are not intended to be limiting. Unless otherwise indicated, all percentages are by weight unless otherwise specified.

EXAMPLES

Polyethylenes

The HI polyethylene has a melt index, $I_2$, of 0.65 grams/10 minutes; a density of 0.916 g/cc; and a SCBDI of greater than 70. It is an ethylene-octene copolymer sold under the trademark SURPASS® FPS 016 by NOVA Chemicals. A normalized impact strength of 711/g/mil is reported on the MatWeb Internet website and may be regarded as a typical value for a blown film having a thickness of 1 mil that is prepared from this HI polyethylene.

The LD polyethylene is an ethylene homopolymer having a melt index of 2.3 and a density of 0.919 and is sold under the trademark NOVAPOL® LF 0219 A.

The Z/N polyethylene is an ethylene-butene copolymer having a melt index of 0.8 g/10 minutes and a density of 0.921 g/cc sold under the tradename NOVAPOL PF-Y821-CP by NOVA Chemicals. The normalized impact strength of a film prepared from this polyethylene is reported on MatWeb internet website as 94 grams/mil and this value may be regarded as typical.

Test Methods

Impact strength is measured according to ASTM D1709/A ($F_{50}$ standard) and is reported in grams/mil.

Machine Direction (MD) Tear and Transverse Direction (TD) Tear is measured according to ASTM D1922 and is reported in grams/mil.

Machine Direction (MD) Modulus and Transverse Direction (TD) Modulus is measured according to ASTM D882 and is reported in mega Pascals (MPa).

Density is measured according to ASTM D792 and is reported in grams/cubic centimeter (g/cc).

Melt index, $I_2$, is measured according to ASTM D1238 (using a 2.16 kg weight at a temperature of 190° C.).

Example 1

The films were made on a three layer coextrusion film line manufactured by Brampton Engineering. Three layer films having a total thickness of 3 mils were prepared using a blow up ratio (BUR) of 2.5/1.

The A-B-C structures of these three layer films are described in more detail in Table 1. For clarity: the inventive film 4 has an A/B/C layer ratio of 20/60/20 (meaning that each of the skin layers A and C contained 20 weight % of the total amount of polyethylene and the core layer B contained 60 weight %). Each of the skin layers (A and C), was made with HI polyethylene, and the core layer was made with a blend of 90% Z/N+10% LD.

Example 2

Five layer films were prepared on a blown film line that was fed with 5 extruders. The A/B/C/D/E structures are defined in Table 2. The films had a thickness of 3.5 mils and were prepared using a BUR of 2.5/1.

Example 3 (Comparative)

A series of comparative three layer films were prepared in which the skin layers were prepared with the above described HI resin and the core layer was prepared with a blend of the HI resin with a homopolymer Z/N resin having a density of 0.958 g/cc and a melt index of 1 (sold under the trademark SCLAIR® 19C). The layer ratio of the A/B/C structures were 20/60/20 (as per Example 1) and films having a thickness of 3 mils were prepared at a BUR of 17/1. These films were comparative as they are difficult to process—but the physical properties of the films are very good. Four different films were studied in which the core layer composition was varied for a blend of 72% HI+28% Z/N to a blend of 25% HI+75% Z/N. As expected, the stiffness of the resin increased as the amount of high density Z/N resin in the core layer increased. In addition, the hot tack of the films (as determined by ASTM F1921-28) remained surprisingly high. These films would be especially suitable for the preparation of heavy duty sacks.

TABLE 1

Three Layer Films

| Layer Ratio | Film Structures | Impact Strength | MD Tear | TD Tear | MD Modulus | TD Modulus |
|---|---|---|---|---|---|---|
| 1 - C 20/60/20 | HI HI HI | >600 | 332 | 391 | 139 | 148 |
| 2 - C 20/60/20 | HI Z/N HI | 287 | 349 | 389 | 177 | 184 |
| 3 - C | 85% HI + 15% LD Z/N 85% HI + LD | 188 | 269 | 378 | 182 | 182 |
| 4 20/60/20 | HI 90% Z/N + 10% LD HI | 279 | 302 | 420 | 175 | 192 |

Comparative Structure 1 contains all the three layers of HI polyethylene. This film has excellent impact strength but is difficult to extrude.
Comparative Structure 2 contains Z/N in the core. This film has a desirable balance of properties but is also difficult to extrude.
Comparative Structure 3 contains LD blended in skins to improve melt strength. This structure shows lower impact strength but the presence of the LD resin improves extrusion.
Inventive Structure 4 contains LD blended with Z/N in the core which improves melt strength. This film has higher impact and tear strength than the film in structure 3. The use of LD resin allows this film to be more easily extruded than structures 1 and 2.

TABLE 2

Five Layer Films

| Layer Ratio | Five Layer C-ex Film Structures | Impact Strength | MD Tear | TD Tear | MD Modulus | TD Modulus |
|---|---|---|---|---|---|---|
| A 26/19/10/18/27 | 100% HI 80% Z/N + 20% LD 100% HI 80% Z/N + 20% LD 100% HI | 212 | 417 | 580 | 267 | 284 |
| B 26/19/10/18/27 Comparative | 95% HI + 5% LD 95% Z/N + 5% LD 100% PEB 95% Z/N + 5% LD 95% HI + 5% LD | 168 | 370 | 558 | 278 | 306 |

Inventive Structure A contains HI skins. The sub-skin layers of Z/N contain LDPE blended in them to improve melt strength. This film exhibits good impact and is easily extruded. Structure B contains LDPE in skin and sub-skin layers. This structure shows lower dart and tear properties than structure B. The "PEB" in the middle layer is a polyethylene homopolymer sold under the trademark SURPASS HPs 167 and in wide use as a barrier resin. This structure would be suitable for use as a barrier film (for packaging dry goods such as crackers or breakfast cereal).

The present invention has been described with reference to certain details of particular embodiments thereof. It is not intended that such details be regarded as limitations upon the scope of the invention except insofar as and to the extent that they are included in the accompanying claims.

What is claimed is:

1. A multilayer film having a normalized impact strength of at least about 300 grams, the film comprising an HI polyethylene that is prepared with a metallocene catalyst and has a density of from 0.915 to 0.930 g/cc and an SCBDI of from 70 to 100; a Z/N polyethylene; and an LD polyethylene, said film comprising
    A) a skin layer consisting essentially of said HI polyethylene; and
    B) a core layer consisting essentially of said Z/N polyethylene and said LD polyethylene, with the provisos that
   a) the amount of said HI polyethylene is from 30 to 55 weight %, based on the combined weight of said HI polyethylene plus said Z/N polyethylene plus said LD polyethylene that is contained in said multilayer film; and
   b) the amount of said LD polyethylene is from 5 to 20 weight %, based on the combined weight of said HI polyethylene plus said Z/N polyethylene plus said LD polyethylene that is contained in said multilayer film.

2. The multilayer film of claim 1 wherein said HI polyethylene has a melt index, $I_2$, of from about 0.5 to about 2.0 g/10 minutes.

3. The multilayer film of claim 1 wherein said Z/N polyethylene has a density of from about 0.910 to about 0.965 g/cc.

4. The multilayer film of claim 1 wherein said Z/N polyethylene has a density of from about 0.915 to about 0.960 g/cc.

5. The multilayer film of claim 1 wherein said Z/N polyethylene has a melt index, $I_2$, of from about 0.2 to about 10 g/10 minutes.

6. The multilayer film of claim 1 wherein said Z/N polyethylene has a melt index, $I_2$, of from about 0.5 to about 5 g/10 minutes.

7. The multilayer film of claim 1 wherein said Z/N polyethylene has a density of from about 0.910 to about 0.965 g/cc and a melt index, $I_2$, of from about 0.2 to about 10 g/10 minutes.

8. The multilayer film of claim 1 wherein said Z/N polyethylene has a density of from about 0.915 to about 0.960 g/cc and a melt index, $I_2$, of from about 0.5 to about 5 g/10 minutes.

9. The multilayer film of claim 1 wherein said HI polyethylene has a melt index, $I_2$, of from about 0.5 to about 2.0 g/10 minutes and wherein said Z/N polyethylene has a density of from about 0.915 to about 0.960 g/cc and a melt index, $I_2$, of from about 0.5 to about 5 g/10 minutes.

10. The multilayer film of claim 1 wherein said LD polyethylene has a melt index, $I_2$, of from about 0.2 to about 10 g/10 minutes.

11. The multilayer film of claim 1 wherein said LD polyethylene has a melt index, $I_2$, of from about 0.3 to about 5 g/10 minutes.

12. The multilayer film of claim 1 wherein said LD polyethylene has a density of from about 0.915 to about 0.930 g/cc.

13. The multilayer film of claim 1 wherein said LD polyethylene has a melt index, $I_2$, of from about 0.3 to about 5 g/10 minutes and a density of from about 0.915 to about 0.930 g/cc.

14. The multilayer film of claim 1 wherein said HI polyethylene has a melt index, $I_2$, of from about 0.5 to about 2.0 g/10 minutes and wherein said Z/N polyethylene has a density of from about 0.915 to about 0.960 g/cc and a melt index, $I_2$, of from about 0.5 to about 5 g/10 minutes and wherein said LD polyethylene has a melt index, $I_2$, of from about 0.3 to about 5 g/10 minutes and a density of from about 0.915 to about 0.930 g/cc.

15. A multilayer film from about 1 to about 6 mils in total thickness and having a normalized impact strength of at least about 300 grams, the film comprising an HI polyethylene; and a Z/N polyethylene; and an LD polyethylene; said film comprising
   A) a skin layer consisting essentially of said HI polyethylene; and
   B) a core layer consisting essentially of a blend of said Z/N polyethylene and said LD polyethylene,
wherein
   i) said HI polyethylene is prepared with a metallocene catalyst and has a density in the range of from 0.915 to about 0.930 g/cc, a melt index, $I_2$, of from about 0.5 to about 2.0 g/10 minutes, an SCBDI of from about 70 to about 100 and is present in the range from about 30 to about 55 weight %, based on the combined weight of said HI polyethylene plus said Z/N polyethylene plus said LD polyethylene that is contained in said multilayer film; and
   ii) said LD polyethylene has a melt index, $I_2$, of from about 0.3 to about 5 g/10 minutes and a density of from about 0.915 to about 0.930 g/cc and is present in the range from about 5 to about 20 weight %, based on the combined weight of said HI polyethylene plus said Z/N polyethylene plus said LD polyethylene that is contained in said multilayer film; and
   iii) said Z/N polyethylene has a density of from about 0.915 to about 0.960 g/cc and a melt index, $I_2$, of from about 0.5 to about 5 g/10 minutes.

16. The multilayer film of claim 15, wherein the total film thickness is less than about 2 mils and wherein the core layer is at least about 0.5 mils thick.

17. The multilayer film of claim 15, wherein the core layer contains from about 40 to about 70 weight % of the total amount of polyethylene based on the combined weight of said HI polyethylene plus said Z/N polyethylene plus said LD polyethylene.

18. A polyethylene package comprising a multilayer film having a normalized impact strength of at least about 300 grams, the film comprising an HI polyethylene; and a Z/N polyethylene; and an LD polyethylene; said film comprising
   A) a skin layer consisting essentially of said HI polyethylene; and
   B) a core layer consisting essentially of a blend of said Z/N polyethylene and said LD polyethylene,
wherein
   i) said HI polyethylene is prepared with a metallocene catalyst and has a density in the range of from 0.915 to about 0.930 g/cc, a melt index, $I_2$, of from about 0.5 to about 2.0 g/10 minutes, an SCBDI of from about 70 to about 100 and is present in the range from about 30 to about 55 weight %, based on the combined weight of said HI polyethylene plus said Z/N polyethylene plus said LD polyethylene that is contained in said multilayer film; and
   ii) said LD polyethylene has a melt index, $I_2$, of from about 0.3 to about 5 g/10 minutes and a density of from about 0.915 to about 0.930 g/cc and is present in the range from about 5 to about 20 weight %, based on the combined weight of said HI polyethylene plus said Z/N polyethylene plus said LD polyethylene that is contained in said multilayer film; and
   iii) said Z/N polyethylene has a density of from about 0.915 to about 0.960 g/cc and a melt index, $I_2$, of from about 0.5 to about 5 g/10 minutes.

* * * * *